Patented Apr. 3, 1928.

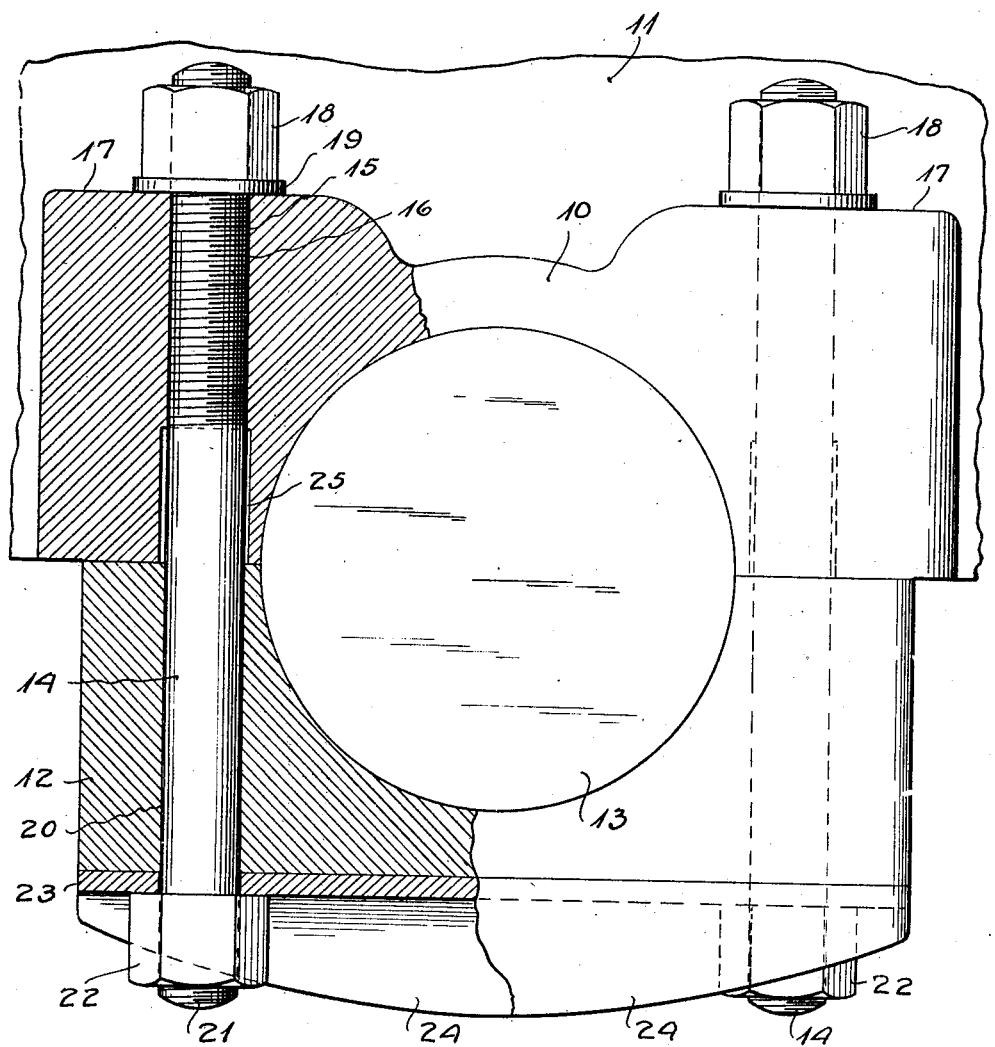

1,664,944

UNITED STATES PATENT OFFICE.

HERBERT G. RITTER, OF WAUKESHA, WISCONSIN, ASSIGNOR TO WAUKESHA MOTOR COMPANY, OF WAUKESHA, WISCONSIN, A CORPORATION OF WISCONSIN.

BEARING-BOLT STRUCTURE.

Application filed April 20, 1927. Serial No. 185,085.

This invention relates to an improved arrangement for securing together the stationary and movable members of a bearing structure where the metal of the structure is comparatively soft. The invention is particularly useful in connection with internal combustion engines where softer metal, as for example, aluminum, is extensively used for the crank case and bearing structure. Where harder metal is used in bearing structures, a common practice has been to thread bolt studs into the stationary bearing member, but where softer metal, such as aluminum, is used, this is not practical because of the unreliable nature of a screw thread in such soft metal. To overcome this, where soft metal was used, through bolts with a nut at each end have been used to hold the movable member or bearing cap in place, but it has been found that with this arrangement the pressure is so great between the washer under the nut and the aluminum that the elastic limit of the aluminum is exceeded and a permanent depression is made so that the bolt becomes loosened.

It is the object of this invention to overcome all the above objectionable structures and this is accomplished by threading the bolt into the aluminum of the stationary bearing part in addition to having it extending through, and providing a nut at its end to be screwed down against the aluminum. The increased surface thus obtained and the uniform distribution of loading will permit a very much heavier load being carried without producing a permanent set in the aluminum. At the other end of the bolt the pressure of the nut is distributed over the aluminum by means of a heavy forged steel plate, so that with my improved arrangement the weakest point in the structure is changed from the aluminum to the bearing cap nuts and preferably heavier and longer nuts are used than ordinarily.

Another object of the invention is to prevent distortion of the bearing opening due to the swelling from the thread pressure. This is accomplished by relieving the bolt hole in the stationary bearing member a distance inwardly from the bearing joint by increasing the diameter slightly and leaving the bolt unthreaded.

The figure on the drawing is a side elevational view, partly in section, of a bearing structure showing the application of my improved bolt structure and arrangement thereto.

The upper bearing part 10 may be an integral part of the crank case frame 11, and 12 represents the removable bearing part or cap, the bearing structure being shown as journaling the shaft 13. This may be the crank shaft of the engine.

Each of the supporting bolts 14 has the threaded end 15 for engaging in the threaded passageway 16 through the stationary bearing part 10, this threaded end extending beyond the seating surface 17 to receive the nut 18, a washer 19 being preferably interposed between the nut and the seating surface. Each nut has thus the combined holding surface of the threads on the aluminum and the nut on the seat 17.

The bearing cap 12 has the passageways 20 for the projecting ends of the bolts, the ends 21 projecting beyond the outer side of the cap being threaded for the reception of nuts 22. To distribute the pressure of the nuts 22 over the aluminum cap and to prevent depressing of the aluminum by the nuts, a heavy forged steel plate 23 is inserted between the bearing cap and the nuts of the set of bolts for holding the cap in place. This plate may be strengthened against bending by the flanges or ribs 24 along its longitudinal edges.

To prevent distortion of the bearing openings due to the swelling from the pressure of the threads, the bolt holes 16 are relieved for a distance from the face of the bearing member 10, as indicated at 25, and the bolt may be left unthreaded along this part. Any distortion would then occur at the upper ends of the enlarged parts 25 and not at the bearing joint.

With my improved arrangement I obtain all the advantages of through bolts and studs with the combined holding strength of both. It is found that with my arrangement aluminum will withstand a load sufficient to cause failure of nuts of the size ordinarily used, but this is readily overcome by making the nuts 22 longer and heavier. The insertion of the steel plate 23 adds greatly to the strength and rigidity of the structure, and such plate, together with the relief arrangement 25, will prevent any distortion or give of the aluminum. The nuts 22 could be of a weight and strength so gauged that in case of abnormal strain on the bearing structure these nuts will give and thus save the aluminum parts from distortion or breakage.

Having described my invention, I claim the following:—

1. In a bearing structure, the combination of the upper and lower bearing members, bolts passing through one of said members and having threaded engagement therewith, nuts engaging the ends of said bolts and abutting against said bearing member, said other bearing member having passageways through which the other ends of said bolts extend, and nuts engaging such other ends of the bolts and abutting against said other bearing member, whereby said bearing members are secured together.

2. In a bearing structure, the combination of the bearing members, through bolts extending through said members and having threaded engagement with one of said members, and nuts engaging the ends of said bolts and abutting against said members.

3. In a bearing structure, the combination of the bearing body and the bearing cap, bolts extending through said body and having threaded engagement with the outer part thereof but being relieved of the inner part thereof, said bolts projecting beyond said body, nuts engaging said projecting ends and abutting against said body, the threaded engagement of said bolts and nuts with said body causing said bolts to be securely anchored to the body, said cap having passageways receiving said bolts, and nuts engaging said bolts and abutting against said cap to secure the cap to the body.

4. In a bearing structure, the combination of upper and lower bearing parts, bolts extending through said parts, said bolts having extended threaded engagement with said upper bearing part and having abutments for engaging against the top of said bearing part, said abutments and threading engagement securely anchoring said bolts to said upper bearing part, and nuts engaging the other ends of said bolts and abutting against said lower bearing part to secure it to the upper bearing part.

5. In a bearing structure, the combination of upper and lower bearing parts of comparatively soft metal, through bolts having extended threaded engagement with said upper bearing part, nuts engaging said bolts and abutting against the upper bearing member to assist the threaded engagement of said bolts with said upper bearing member to securely anchor the bolts to said bearing member, a plate of comparatively hard metal receiving said bolts and engaging against the lower face of the lower bearing member, and nuts on said bolts engaging against said plate for securing said lower bearing member to said upper bearing member.

6. In a bearing structure, the combination of upper and lower bearing members, bolts extending through said members, said members being of comparatively soft material, said bolts having extended threaded connection with said upper bearing members at the outer part thereof but being relieved from said bearing member at the lower part thereof, nuts engaging said bolts and abutting against the upper bearing member, a plate of hard metal receiving the bolts and engaging against the lower face of the lower bearing member, and nuts on said bolts engaging against said plate to distribute the pressure over said lower bearing member and secure it to said upper bearing member.

In witness whereof, I hereunto subscribe my name this 14th day of April, 1927.

HERBERT G. RITTER.